United States Patent [19]
Mautz

[11] 3,917,304

[45] Nov. 4, 1975

[54] LOADING CONTAINER MEANS

[76] Inventor: Frances E. Mautz, 7922 Fairfield St., Philadelphia, Pa. 19154

[22] Filed: Dec. 20, 1973

[21] Appl. No.: 426,943

Related U.S. Application Data

[62] Division of Ser. No. 175,439, Aug. 27, 1971, Pat. No. 3,784,054.

[52] U.S. Cl. ............................................ 280/43.23
[51] Int. Cl.² ........................................ B62D 21/18
[58] Field of Search .......... 280/43.23, 43.17, 43.13, 280/43.24, 79.1, 79.2, 79.3

[56] References Cited
UNITED STATES PATENTS

| | | | |
|---|---|---|---|
| 1,857,653 | 5/1932 | Meyercord | 280/43.24 |
| 3,544,127 | 12/1970 | Dobson | 280/43.17 |
| 3,580,601 | 5/1971 | Miles | 280/79.1 |

Primary Examiner—Robert R. Song

[57] ABSTRACT

A loading container means comprising a body having horizontal top and bottom walls and vertical side walls providing a storage chamber therein, at least one of said walls providing an opening to said chamber of the body which is enclosed by a door, at least one of the walls is movable for controllably reducing the size of the chamber of the body to confine the material stored therein, and a plurality of wheel units movable between a retracted position and an extended position for movably supporting the body over a supporting surface when in their extended position. The body is of elongated configuration with first and second ends which are respectively provided with wheel units which are selectively actuatable allowing controlled elevating, lowering and leveling of the body.

12 Claims, 6 Drawing Figures

U.S. Patent Nov. 4, 1975 Sheet 1 of 2 3,917,304
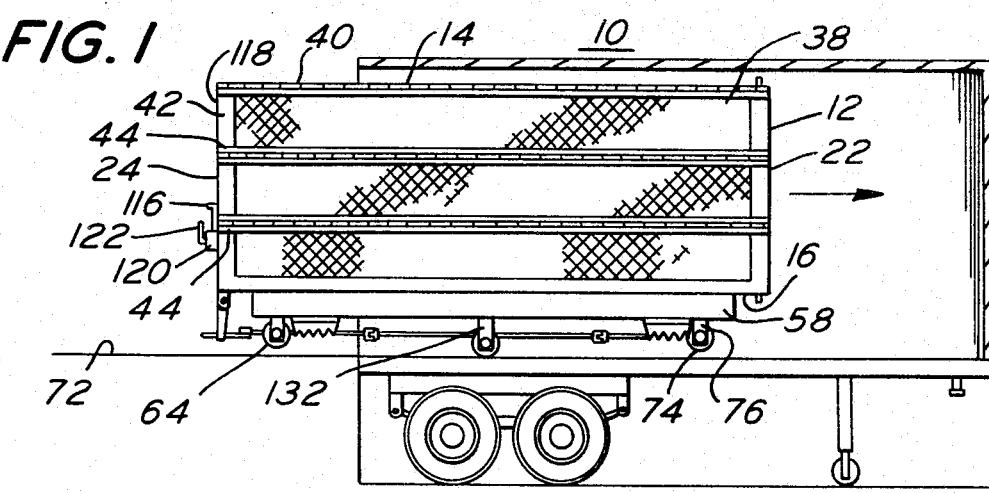
FIG. 1
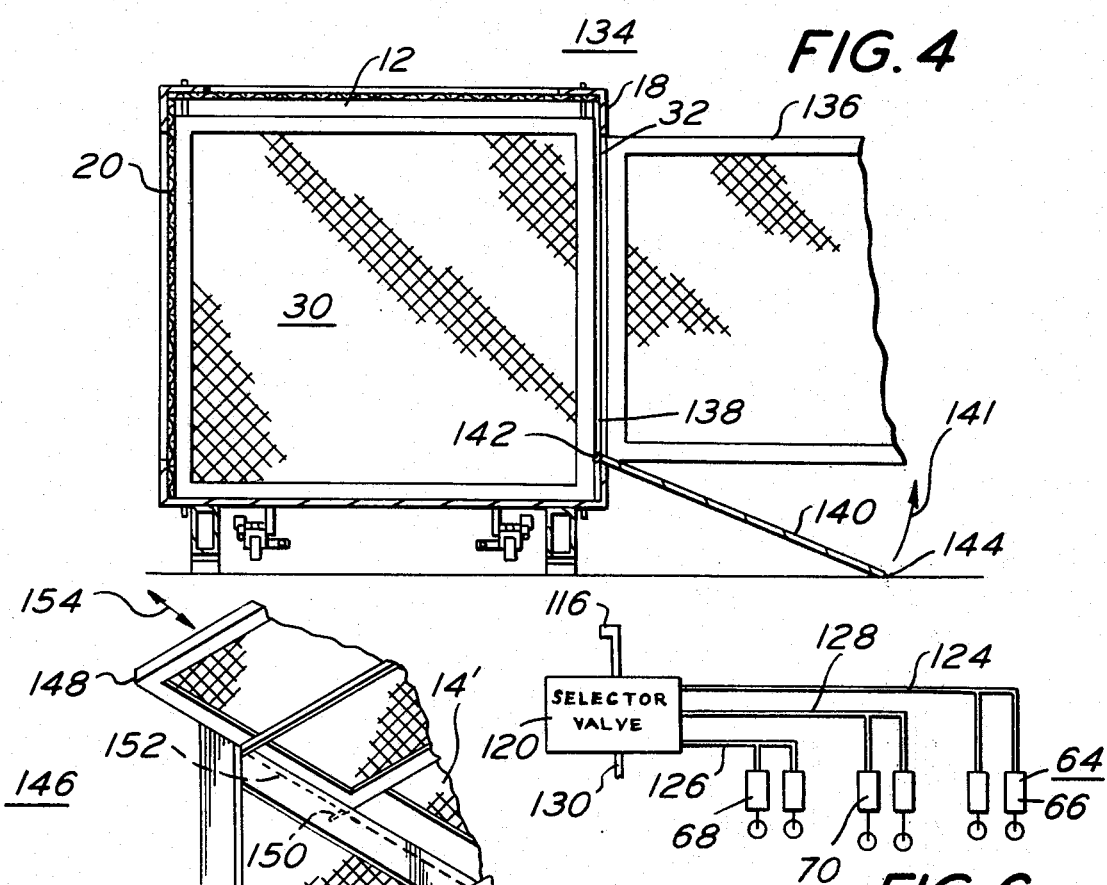
FIG. 4
FIG. 5
FIG. 6

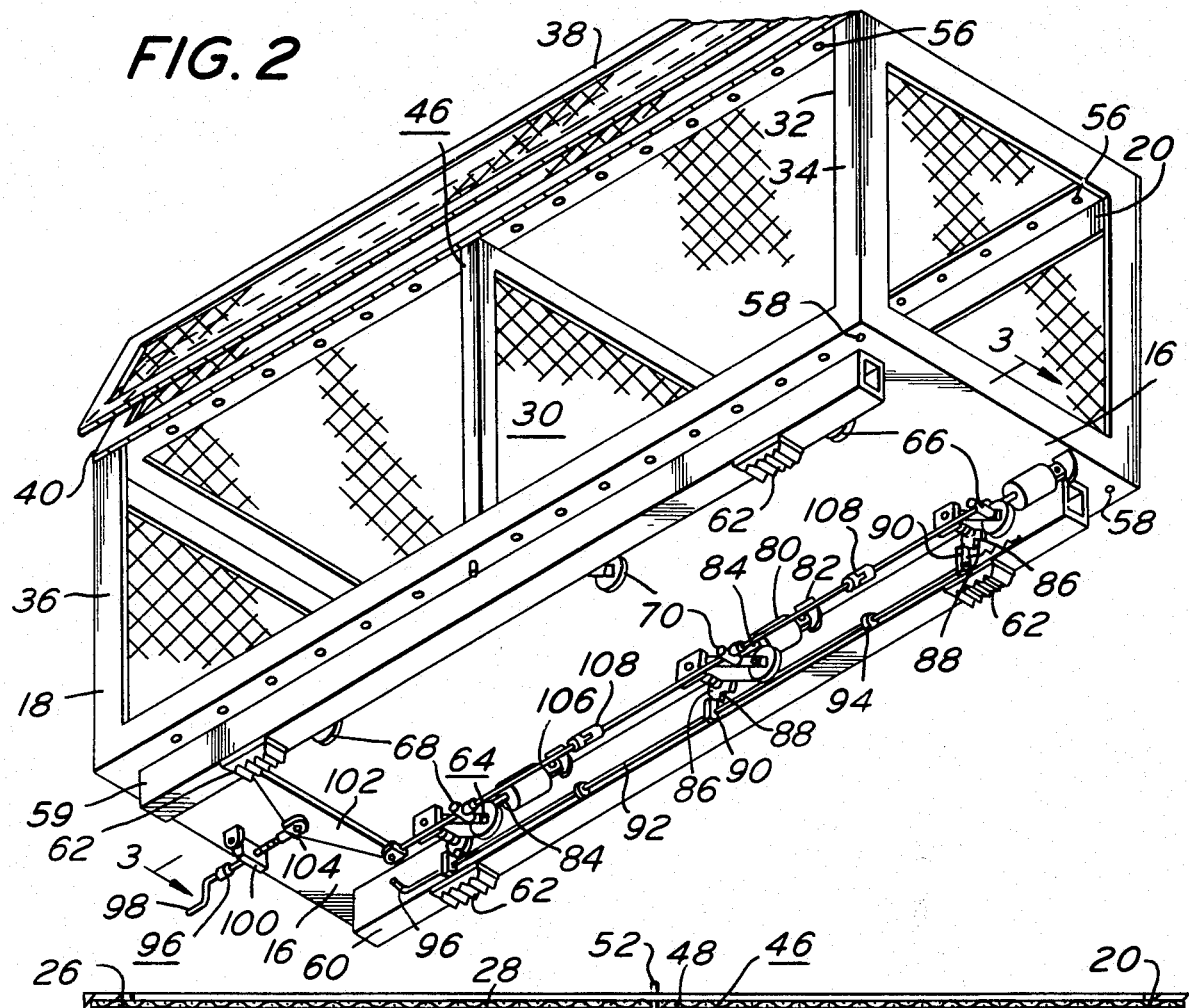
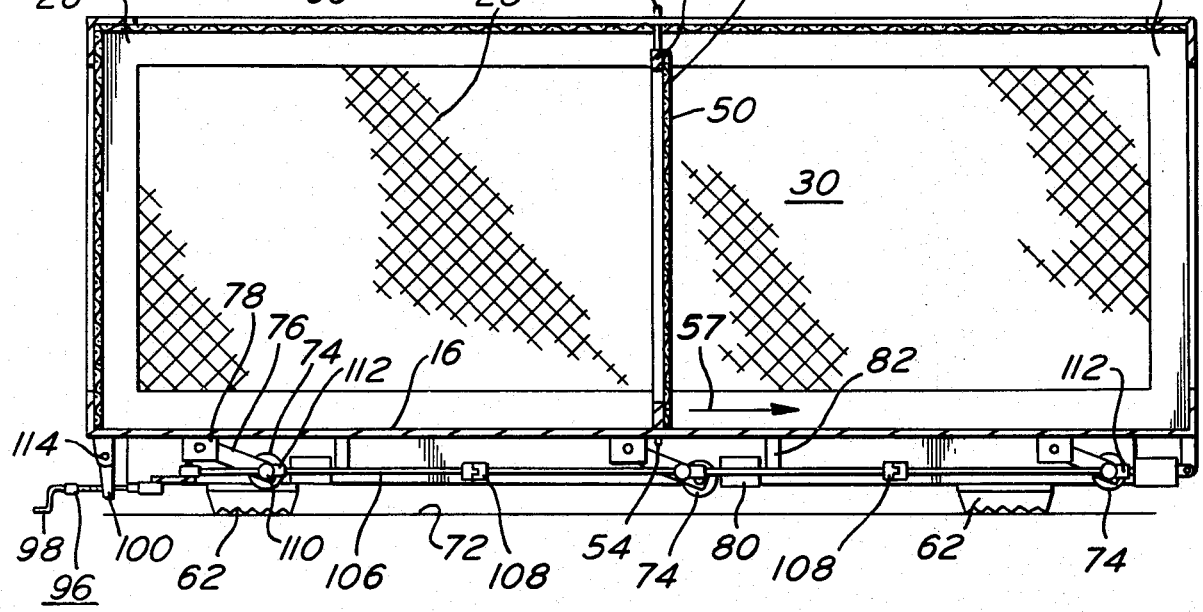

LOADING CONTAINER MEANS

This is a division of application Ser. No. 175,439 filed Aug. 27, 1971, issued as U.S. Pat. No. 3,784,054 on Jan. 8, 1974.

The invention relates to a loading container means, and more particularly to a container means in the form of an interliner adapted to be received by a truck trailer or other freight transport means.

It is common to load freight directly into a truck trailer of freight train. This requires an extended amount of time for loading, inactivates such transport means and prevents their most efficient utilization. The loading container means of the invention is provided for moving freight in a faster, safer, cheaper and more practical manner and some of the advantages and objects acheived by the loading container means will be evident from the description which follows.

A principal object of the invention is to provide a new and improved loading container means which is rectangular in configuration and conforms with the body of a trailer or transport means to increase the efficiency and ease of loading and unloading of items to be transported.

Another object of the invention is to provide a new and improved loading container means which may be easily and readily moved from the processing location to the dock for loading and then into the transport means into which it is to be loaded, and afterwards removed from such transport means to the new location where it can readily be wheeled to the processing station.

Another object of the invention is to provide a new and improved loading container means which include means for moving same over a supporting structure as well as means for leveling, lowering and raising same to facilitate in the loading and unloading thereof.

Another object of the invention is to provide a new and improved loading container means provided with an opening and door which allows high accessibility to the contained material, and where desirable a built-in ramp for ease of movement of items in and out of the container means.

Another object of the invention is to provide a new and improved loading container means which may have its chamber varied in size to restrict the retained material and prevent its shifting and movement to avoid damage to such items and limit cargo instability.

Another object of the invention is to provide a new and improved loading container means utilizing pneumatic and mechanical means for actuating its wheel units, and allowing retraction of its wheels to set, fix and immobilize the container means in a predetermined position on its supporting surface.

Another object of the invention is to provide the loading container means with a plurality of wheel units allowing the ready movement of the means and providing pivot wheel means for allowing easy control and turning of the container means when its wheel units are extended.

Another object of the invention to provide a new and improved loading container means of a size adapted for being received either alone or in multiple units within a freight carrying means while most efficiently occupying the space within the carrier means and allowing the efficient removal and replacement of same during loading and unloading operations.

Another object of the invention is to provide a new and improved loading container means of great strength, low weight and long durability.

Another object of the invention to provide a new and improved loading container means requiring a minimum of maintenance and operating cost.

The above objects as well as many other objects of the invention are achieved by providing a loading container means comprising a body having horizontal top and bottom walls and vertical side walls providing a storage chamber therein with at least one of said walls providing an opening to the chamber of the body. The opening to the chamber is enclosed by a door which is hinged with the body for movement between open and closed positions. At least one of the walls is movable for controllably reducing the size of the chamber of the body to confine materials stored therein. A plurality of wheel units are secured with respect to the bottom wall of the body for movably supporting the body over a supporting surface. Each of the wheel units is provided with a wheel element which is movable between a retracted position and an extended position. Pneumatic means is provided for actuating the wheel elements between the retracted and extended positions. A plurality of pedestal members extending downwardly from the body, support the body on a supporting surface against movement when the wheel elements are in their retracted positions.

The body is of a elongated configuration with first and second ends, the first and second ends of the body being respectively provided with wheel units. The means for actuating the wheel elements include control means for providing independent actuation for the wheel units provided at the first end of the body with respect to the wheel units provided at the second end of the body, for allowing the controlled elevating, lowering and leveling of the body. Mechanical means including movable rod means are also provided for engaging the wheel elements for actuating the wheel elements between their retracted and extended positions independent of the actuation provided by the pneumatic means.

Pivot wheel units are provided intermediate the ends of the body which are extendible downwardly from the bottom wall to an extent allowing it and only the wheel units of either of the first and second ends of the body to concurrently contact the supporting surface while the wheel units at the other end disengage the surface so that when the pivot wheel is in its extended position the body can be turned and directed about the pivot wheel unit enhancing the control of movement of the body over the supporting surface.

The foregoing and other objects of the invention will become more apparent as the following detailed description of the invention is read in conjunction with the drawings, in which:

FIG. 1 is a front elevational view of a loading container means embodying the invention being loaded onto a trailer transport means, FIG. 2 is a perspective view of the means shown in FIG. 1, FIG. 3 is a sectional view taken on line 3—3 of FIG. 2 with its door partially folded open, FIG. 4 is a sectional view taken of a modified form of the loading container means,

3

FIG. 5 is a perspective view similar to that of FIG. 2 illustrating a portion of another modified form of the container means, and FIG. 6 is a diagrammatic representation of the pneumatic actuating and control means of the loading container means.

Like reference numerals designate like parts throughout the several views.

Referring to FIGS. 1, 2 and 3, the loading container means 10 embodying the invention comprises a body 12 of rectangular configuration having top and bottom walls 14, 16, front and rear side walls 18 and 20 and end walls 22 and 24. The body 12 may be made of any strong durable material such as steel, fiberglass and aluminum as examples.

The bottom wall 16 may be made of a solid sheet of metal, while the top, side and end walls may be formed by rectangular frames 26 supporting wire mesh material 28 providing a chamber 30 within the body 12. The mesh 28 provides for ready visibility of the contents within the chamber 30 of the body 12 as well as control of the temperature therewithin by air conditioning or heating of the environment. The front side 18 of the body 12 has an opening 32 extending from the front end 34 to the rear end 36 of the body providing ready accessability to the chamber 30. The opening 32 is enclosed by a door 38 of rectangular configuration which is hinged along its top edge 40 with the longitudinal side edge of the top wall 14 of the body 12. The door 38 is also provided with a rectangular frame 42 of trifold construction having hinges 44 parallel to the top edge 40, thereby dividing the door 38 into three foldable sections. Each of the sections of the door 38 may also be provided with metal mesh within the frame 42.

FIG. 1 discloses the loading container means 10 with its door 38 in the closed position, while FIG. 2 shows the door 38 folded upwardly in the process of being positioned to rest on the top wall 14 completely removed from the opening 32 of the body 12 and out of the way of any operation of loading or unloading the chamber 30 of the body 12.

The container means 10 is provided with a movable end wall 46 of rectangular configuration comprising a frame 48 of reduced dimensions for being received within the chamber 30 and metal mesh 50 supported thereby, and includes a pair of parallel top rods 52 extending upwardly from the top of the frame 48, and a pair of shorter parallel bottom rods 54 extending downwardly from the bottom of the frame.

The top wall is provided with first and second sets of spaced openings 56 linearly arranged along its respective longitudinal side edges, while the bottom wall 16 of the body 12 is similarly provided with first and second sets of spaced openings 58, linearly arranged on opposite sides thereof extending from the front to rear end walls 22, 24 of the body 12 as shown in FIG. 2. The movable end wall 46 is vertically positioned and retained within the chamber 30 with its upwardly extending rods 52 received through respective one of a pair of openings 56 in the top wall 14 of the body 12 while its downwardly extending bottom rods 54 are received through the respective ones of a pair of openings respectively of the sets of openings 58 in the bottom wall 16.

When the chamber 30 of the body 12 is only partially filled with items to be transported, the movable wall 46 can be positioned to restrict the portion of the chamber 30 containing the goods to avoid their damage by tumbling and minimize instability due to change in the position and movement of the load carried by the transport means. The movable end wall 46 may be repositioned by moving it vertically until the bottom rods 54 disengage and are removed from the openings 58 in the bottom wall 16 of the body 12. The bottom of the end wall 46 may now be pivoted about the top rods 52 in the direction of the arrow 57 in FIG. 3, until the top rods 52 can be disengaged from the pair of upper openings 56 in the top wall 14. With the movable end wall disengaged, it may be replaced in any desired position to enlarge or restrict the chamber 30 by first inserting the ends of the longer top rods 52 through the openings in the top wall 14, moving the wall 46 in the upward direction and aligning the ends of the shorter rods 54 with a pair of openings in the bottom wall 16. The movable end wall 46 is then moved downwardly extending the bottom rods 54 through the openings in the bottom wall 16. The end wall 46 may thus be easily manipulated after the chamber 30 has been partially loaded and while the door 38 is in the open position. After the door 38 encloses the opening 32, the goods are fully restricted and contained within the reduced volume of the chamber 30. FIG. 1 illustrates the movable end wall 46 at the front end of the body 12 providing maximum volume for the chamber 30, while FIGS. 2 and 3 show the end wall 46 in an intermediate position providing a reduced volume for the goods to be received into the chamber 30.

The container means 10 is provided with a pair of parallel supporting rails 59, 60 which may be of hollow rectangular configuration preferably of high strength material such as steel secured with the bottom surface along each longitudinal side of the bottom wall 16. Each of the rails 59, 60 is provided with a pair of spaced supporting pedestals 62 respectively proximate the front and rear ends 34 and 36 of the body 12. The pedestals 62 may be provided with a bottom undulating surface and made of a resilient material such as rubber. When the pedestals 62 engage a supporting surface, they resiliently support and firmly fix the container means 10 against movement and slipping. This is of great utility, when the container means is loaded on a transport means and is subject to the exceleration, deceleration with the movement of the transport vehicle, as well as when the container means 10 is set up on the dock prior to being loaded or after being unloaded from a transport means, when the container means is being processed by having its chamber emptied of or filled with contents.

In order to facilitate the ready movement of the container means 10 from the site where its chamber 10 is filled or emptied to the site of loading or unloading at the dock or platform of the freight transport station, the container means 10 is provided with a plurality of extendable wheel units 64. A pair of laterally spaced wheel units 66 are positioned to extend downwardly from the bottom wall 16 of the body 12 at the front end 34, while a pair of laterally spaced wheel units 68 are positioned at the rear end 36 of the body 12. A pair of pivot wheel units 70 are positioned intermediate the front and rear wheel units 66 and 68. One of each of the pair of wheel units 66, 68 and 70 is positioned proximate to the inside facing wall of the supporting rail 59, while the other one of said wheel units is positioned opposite its respective wheel unit proximate the oppositely facing inside wall of the supporting rail 60. This positioning provides a highly stable means for movably supporting the container means when the wheel units 64 are in their extended positions.

The wheel units 64 are shown in their retracted positions in FIGS. 2 and 3 whereby the pedestals 62 engage the surface 72 supporting the container means 10 for fixing its position. FIG. 1 illustrates the wheel units 64 in their extended positions, whereby the container means 10 is elevated so that the pedestals 62 lose contact with the supporting surface 72 and the wheels 74 of the wheel units 64 allow ready movement of the container means 10 over the supporting surface 72. The wheel units 64 may be extended or retracted by use of pneumatic or mechanical means as will be described in connection with the container means 10, or by other such means which will be obvious from the description provided.

Each of the wheel units 64, illustrated in connection with the container means 10, includes an elongated element 76 (see FIG. 3) which is pivotally retained at one end by a bracket 78 which is secured with the bottom wall 16 of the body 12. The other end of the elongated wheel element supports for rotation its wheel 74. Each of the wheel units 64 is provided with a pneumatically actuated cylinder 80 which has one end pivotally attached to a bracket 82 which is secured with the bottom wall 16 of the body 12. The other end of the cylinder 80 has a arm 84 extending therefrom which it is movable between its retracted position and extended position by pneumatic force. The extended end of the arm 84 of the cylinder 80 is pivotally secured with the wheel element 76 at a location between the ends of the wheel element for providing a torque force about its pivoted end upon the application of pneumatic force to the cylinder 80. Each wheel element 76 may be provided with a lock plate 86 at its pivoted end for rotation with the wheel element in its movement between its retracted and extended positions. The lock plate 86 has a circular periphery provided with a detent 88. A locking block 90 which is provided for each locking plate 86 and is urged into contact with the periphery of this plate 86, is received into the detent 88 by spring actuating when the wheel element 76 assumes its extended position thereby locking the wheel unit 64 in its extended condition. Each of the block units 90 is attached to one of a pair of actuating rods 92 which are movably supported by the brackets 94 secured respectively with the rails 59, 60. A handle 96 is provided at the end of each of the rods 92 which when actuated against the spring bias removes the blocks 90 from the detents 88 of the locking plates 86, thereby unlocking the wheel units for assuming their retracted positions. The locking means thus provided, assures the retention of the wheel units in their down or extended positions even after removal of the pneumatic actuating force, allowing ready movement of the container means 10 without reliance on the pneumatic pressure source.

The loading container means 10 may be provided with a mechanical system for actuating the wheel units 64 or as illustrated by both a pneumatic actuating means and mechanical actuating means 96 each independently actuating the wheel units 64. The mechanical actuating means 96 is provided by a crank 98 extending beyond the rear end 36 of the container means 10 with an extending end threadedly engaging an opening in the bracket 100 which is pivotally secured with the bottom walls 16 of the container means 10 as shown in FIGS. 2 and 3. A cross arm 102 is connected by a rotatable joint 104 with the extending end of the crank 98 for being actuated toward and away from the bracket 100 with the respective counterclockwise and clockwise rotation of the crank 98. The ends of the cross arm 102 are respectively joined to a pair of draw rods 106 one of which is shown in FIG. 2. The rods 106 each comprise three sections which are joined together by universal joints 108 positioned respectively between the wheel units 64 along said rods 106. Each of the wheel elements 76 at its wheel supporting end is provided with a pivotal secured horizontally extending hub 110 having an opening therethrough which freely receives the rod 106 therethrough. The rod 106 has secured with it a block 112 proximate to the hub 110 of the wheel unit 64 which is of sufficient size so that it cannot pass through the hub opening through which the rod extends.

In order to move the wheel units 64 from their retracted positions as shown in FIG. 3 into their extended positions as shown in FIG. 1, by the utilization of the mechanical means 96 described, the crank 98 is rotated in the counterclockwise direction to move the rods 106 in the direction toward the rear end 36 of the body 12. As the rods 106 are moved in that direction, the blocks 112 exert a torque on the wheel elements 76 causing them to pivot downwardly into their perpendicular positions. As the wheels 74 move downwardly the hub 110 pivots to accomodate this action as does the bracket 100. When in their extended positions, the wheels are locked by the locking plate 86 and the blocks 90 as previously described. After release of the locking means by actuation of the rods 92, the mechanical means 96 may be used for lowering the container means 10 for fixed support on the pedestals 62. In the lowering action, the wheels are caused by gravitational force to have their hubs in contact with and follow the retracting movement of the blocks 112 on the draw rods 106. The wheel units 64 may also be moved to a position intermediate the extended and retracted positions which may be desired for movement of the container means 10 into a restricted location or into a transport means, afterwhich the wheel units may be fully extended or retracted as desired.

When the wheel units 64 are in their fully or partially retracted positions, the pneumatic means may be utilized for actuating the wheel units to their extended positions without interference or obstruction by the disclosed mechanical actuating means. This, upon actuation by the pneumatic means, the wheel elements 76 pivot about the end secured with the brackets 78 while the rods 106 move freely through the openings in the hubs 110 at their other ends resulting in the downward displacement of the rods 106 and the pivoting action of the cross arm 102 and crank 98 about the pivot point 114 of the bracket 100 to accomodate such displacement.

Since it may be desirable to lower or raise the front or rear ends 34, 36 of the body 12 to accomodate the pitch of the loading platform or to facilitate loading or removal of the container means 10 from a transport carrier, the invention provides for independent actuation of the front and rear wheel units 66 and 68 by pneumatic means.

FIG. 6 diagrammatically illustrates the means for pneumatically actuating the wheel units 64 between their retracted and extended positions. A pneumatic connector 116 for detachably receiving a hose providing air under pressure is accessibly positioned on the frame 118 of the rear end wall 20 and connected to a selector valve 120 which is positioned thereunder as shown in FIG. 1. The selector valve 120 is provided with a control handle 122 for selecting the distribution of air under pressure individually or concurrently to the pneumatic cylinders 80 of the wheel units 64. As illustrated, the lines 124, 126 and 128 respectively provide air pressure to the pairs of front positioned wheel units 66, rear positioned wheel units 68 and pivot wheel units 70. The cylinders 80, may be of the type selectively receiving air under pressure at opposite sides of a piston for moving its extendible rod in each respective direction, or may be of the type which provides air under pressure to one side of its piston for extending the rod, while providing spring means therein for returning the piston and rod to its retracted position when the air pressure is released through an air relief vent 130.

In operation, the selector valve 120 in one position provides pneumatic pressure to each of the wheel units 64 for concurrently actuating same from their retacted to extended positions. In another position, the selector valve 120 provides for the retraction of the cylinder rods for concurrently retracting the wheel units. Thus the loading container means 10 may be concurrently raised or lowered to a desired level after the wheels 74 engage the supporting surface 72. This results in raising the pedestals 62 so that they lose contact with the surface 72, allowing the container means 10 to be moved at a selected elevation.

The selector valve 120 also provides for selective actuation of the front wheel units 66 or rear wheel units 68 for leveling or controlling the position or orientation of the container means 10. The universal joints 108 provided for the rod means 106 allow the independent raising and lowering of the front and rear wheel units 66 and 68 to the extent desirable for the leveling operation or orientation of the loading container means 10. Such leveling and orientation ability greatly increases the utility and ease of handling of the container means. This is especially true when the dock facilities provide readily available pneumatic pressure for actuating the wheel units 64. The mechanical means 96, of course provides an alternate way for actuating the wheel units in the event that such pneumatic pressure is not available or effective.

To further facilitate the handling of the container means the pivot wheel units 70 are provided with an arm element 132 which is longer than the arm elements 76 of the front and rear wheel units 66 and 68. This is clearly evident from FIG. 1 which illustrates the wheel units in their extended positions. This arrangement allows the container means 10 to be readily directed and pivoted about the pivot wheel units 70 while one or both of the wheels 74 of the front and rear wheel units 64 are out of contact with the supporting surface 72, facilitating such directing and pivoting action. Thus, the fully loaded container means 10 may readily be directed into and out of places with close tolerances with a minimum of effort and maximum speed.

The loading container means 10 thus, provides a highly versatile, efficient and effective means for storing, transporting and processing material which is to be shipped from place to place, while increasing efficiency of operation and management.

FIG. 4 illustrates a loading container means 134 providing a structure substantially identical to that of the container means 10, except that for the provision of a door 136 which is secured along a vertical edge 138 to the side of the body 12 for pivoting about a vertical axis to open and enclose the opening 32 in the side of the container means 134. The container means 134 also includes a ramp 140 which may be made of a strong lightweight material such as magnesium and hinged at 142 along the lower edge of the opening 32. The ramp 140 increases the utility of the container means 134 by facilitating the movement of heavy objects in and out of the chamber 30 when it its extended position as shown in FIG. 4. When the ramp 140 is not in use, it can be pivoted about its hinge 142 in the direction of the arrow 141, so that its extended end 144 moves into an upward vertical position within the chamber 30 proximate to the door 136 in its closed position. The door 136, thus retains the ramp within the chamber 30 and allows its extension only after the door 136 is opened and the container means is positioned for the loading or unloading of its contents.

FIG. 5 illustrates a loading container means 146 which is a further modified form of the container means 10, in which the door 148 is provided with a pair of colinear horizontally extending guide pin 150 which are slidably received in a track 152 at each end of the body 12, for movement between retracted and extended positions, as illustrated by the arrows 154, proximate to the undersurface of the top wall 14' of the body 12'. When the door 148 is extended fully in its horizontal position it can be pivoted about the pins 150 into a vertical position overlying and enclosing the opening 32' in the side of the body 12'. The door 148, thus may be moved to a retracted out of the way position within the body 12' when the container means 146 is being loaded or unloaded, and then may be readily positioned to enclose the opening 32' of the container means 146.

The modified form of the container means 146 also illustrates the utilization of retractable and extendible wheel units 64' having a pneumatic cylinder 152 secrued with the bottom wall 16' providing for the vertical movement of its rod 154 between the retracted and extended positions. The wheel 156 is mounted in a bracket 158 which is pivotally secured with the rod 154 to allow the wheel 156 to swivel for facilitating the turning and directing of the container means 146. The cylinder 152, as illustrated, is of the type utilizing pneumatic pressure selectively on opposite sides of its piston by providing fluid connection inlets 160 and 162 for actuation of the unit either from its retracted position to its extended position, or from its extended position to its retracted position by pneumatic force.

It will be obvious to those skilled in the art that additional modifications and variations of the disclosed container means will be readily apparent, and that the invention may find wide application with appropriate modification to meet the individual design circumstances, but without substantial departure from the essence of the invention.

What is claimed is:

1. A loading container means comprising a body having horizontal top and bottom walls and vertical side walls providing a storage chamber therein, at least one of said walls providing an opening to said chamber of said body, a plurality of wheel units secured with respect to the bottom wall of said body for movably supporting said body over a supporting surface, said wheel units providing a wheel element movable between a retracted position and an extended position, means for actuating the wheel elements between their retracted and extended positions including pneumatic means, said wheel elements including an arm pivoted at one end and supporting a swivel mounted wheel at the other end, said pneumatic means including a pneumatic cylinder secured at one end with the bottom wall of said body and having its other end pivotally attached to said arm for moving said arm from a retracted position proximate the bottom wall of said body to an extended position away from said bottom wall, and lock means for releasably securing said arm in its extended terminal position substantially perpendicular to the bottom wall of said body.

2. The container means of claim 1 including a plurality of pedestal members extending downwardly from said body for supporting said body on said supporting surface against movement thereover when said wheel elements are in their retracted positions.

3. A loading container means comprising a body having horizontal top and bottom walls and vertical side walls providing a storage chamber therein, at least one of said walls providing an opening to said chamber of said body, a plurality of wheel units secured with respect to the bottom wall of said body for movably supporting said body over a supporting surface, said wheel units providing a wheel element movable between a retracted position and an extended position, means for actuating the wheel elements between their retracted and extended positions, said body being of elongated configuration with first and second ends, the first and second ends of said body being each respectively provided with said wheel units, said means for actuating respectively the wheel elements between their retracted and extended positions including pneumatic means, and control means having a selector valve means for providing independent fluid pressure actuation for the wheel units provided at the first end of said body with respect to said wheel units provided at the second end of said body, thereby allowing the controlled elevating, lowering and leveling of said body.

4. The container means of claim 3 in which each of said wheel units includes a pneumatic cylinder with a telescoping arm having an extending end supporting a swivel mounted wheel for being moved in a vertical direction between a retracted position and an extended position by actuation of said pneumatic cylinder.

5. The container means of claim 3 including rod means for engaging said wheel elements and being movable between first and second terminal positions for actuating said wheel elements respectively between their retracted to extended positions independent of the actuation provided by said pneumatic means, said rod means being provided with means for permitting the independent actuation by said pneumatic means of the wheel elements at the first and second ends of said body.

6. The container means of claim 5 including lock means for releasably securing said arm in its extended terminal position substantially perpendicular to the bottom wall of said body.

7. The container means of claim 3 in which a pivot wheel unit is provided intermediate the ends of said body which is extendable downwardly from said bottom wall to an extent allowing it and the wheel units of either of the first and second ends of the body to concurrently contact the supporting surface while the wheel units at the other end disengage said surface, said pivot wheel unit having a wheel element movable between a retracted position and an extended position, whereby when said pivot wheel unit is in its extended position said body can be turned and directed about said pivot wheel unit enhancing the control of movement of said body over said supporting surface.

8. The container means of claim 7 in which said pneumatic means actuates said pivot wheel unit between retracted and extended positions, and said control means provides respectively independent actuation for said pivot wheel unit and the wheel units provided at the ends of said body, and including rod means for engaging said wheel elements and being movable for actuating said wheel elements between their retracted to extended positions independent of the actuation provided by said pneumatic means, whereby said wheel elements may be independently actuated by such mechanical means.

9. A loading container means comprising a body having horizontal top and botttom walls and vertical side walls providing a storage chamber therein, at least one of said walls providing an opening to said chamber of said body, a plurality of wheel units secured with respect to the bottom wall of said body for movably supporting said body over a supporting surface, said wheel units providing a wheel element movable between a retracted position and an extended position, means for actuating the wheel elements between their retracted and extended positions, the wheel elements including an arm pivoted at one end and supporting a wheel mounted at the other end, and said means for actuating the wheel elements between their retracted and extended positions comprising rod means engaging said wheel elements and being movable for actuating said elements between their retracted to extended positions.

10. the container means of claim 9 including lock means for releasably securing said arm in its extended terminal position substantially perpendicular to the bottom wall of said body.

11. A loading container means comprising a body having horizontal top and bottom walls and vertical side walls providing a storage chamber therein, at least one of said walls providing an opening to said chamber of said body, a plurality of wheel units secured with respect to the bottom wall of said body for movably supporting said body over a supporting surface, said wheel units providing a wheel element movable between a retracted position and an extended position, means for actuating the wheel elements between their retracted and extended positions including pneumatic means, and rod means for engaging said wheel elements and being movable for actuating said wheel elements between their retracted to extended positions independent of the actuation provided by said pneumatic means, whereby said wheel elements may be independently actuated by such mechanical means.

12. The container means of claim 11 including lock means for releasably securing said arm in its extended terminal position substantially perpendicular to the bottom wall of said body.

* * * * *